US010886556B2

(12) United States Patent
Tomana et al.

(10) Patent No.: US 10,886,556 B2
(45) Date of Patent: Jan. 5, 2021

(54) POWER GENERATION CELL

(71) Applicant: HONDA MOTOR CO., LTD., Tokyo (JP)

(72) Inventors: Yu Tomana, Wako (JP); Kentaro Ishida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 206 days.

(21) Appl. No.: 16/037,003

(22) Filed: Jul. 17, 2018

(65) Prior Publication Data

US 2019/0027772 A1 Jan. 24, 2019

(30) Foreign Application Priority Data

Jul. 21, 2017 (JP) .................. 2017-141917

(51) Int. Cl.
*H01M 8/242* (2016.01)
*H01M 8/0247* (2016.01)
*H01M 8/0265* (2016.01)
*H01M 8/04119* (2016.01)
*H01M 8/0273* (2016.01)
*H01M 8/0206* (2016.01)

(52) U.S. Cl.
CPC ......... *H01M 8/242* (2013.01); *H01M 8/0206* (2013.01); *H01M 8/0247* (2013.01); *H01M 8/0265* (2013.01); *H01M 8/0273* (2013.01); *H01M 8/04156* (2013.01)

(58) Field of Classification Search
CPC .. H01M 8/242; H01M 8/0206; H01M 8/0273; H01M 8/04156; H01M 8/0265; H01M 8/0247; H01M 8/04291
See application file for complete search history.

(56) References Cited

U.S. PATENT DOCUMENTS

2007/0111083 A1  5/2007  Kikuchi et al.
2018/0269497 A1*  9/2018  Kunz .................. H01M 8/0254

FOREIGN PATENT DOCUMENTS

DE  202015104973  12/2016
JP  2007-141543  6/2007
JP  2015-220128  12/2015
JP  2015-225709  12/2015
WO  WO-2017046398 A1 *  3/2017  ............ H01M 8/247

OTHER PUBLICATIONS

German Search Report for German Patent Application No. 102018117644.9 dated Feb. 27, 2019.
Japanese Office Action for Japanese Patent Application No. 2017-141917 dated Apr. 9, 2019.

* cited by examiner

*Primary Examiner* — Lisa S Park
(74) *Attorney, Agent, or Firm* — Amin, Turocy & Watson, LLP

(57) ABSTRACT

A first metal separator of a power generation cell includes an oxygen-containing gas flow field extending along an electrode surface of a membrane electrode assembly, an oxygen-containing gas supply passage connected to the oxygen-containing gas flow field and extending through the first metal separator in a separator thickness direction, and a passage bead formed around the oxygen-containing gas supply passage and protruding in the separator thickness direction. A water drainage channel configured to connect an inner space of the passage bead with the oxygen-containing gas supply passage is provided at a lower portion of the passage bead.

10 Claims, 11 Drawing Sheets

POWER GENERATION CELL

CROSS-REFERENCE TO RELATED APPLICATION

This application is based upon and claims the benefit of priority from Japanese Patent Application No. 2017-141917 filed on Jul. 21, 2017, the contents of which are incorporated herein by reference.

BACKGROUND OF THE INVENTION

Field of the Invention

The present invention relates to a power generation cell including a bead seal.

Description of the Related Art

In general, a solid polymer electrolyte fuel cell employs a solid polymer electrolyte membrane. The solid polymer electrolyte membrane is a polymer ion exchange membrane. The fuel cell includes a membrane electrode assembly (MEA). The membrane electrode assembly is formed by providing an anode on one surface of the solid polymer electrolyte membrane, and providing a cathode on the other surface of the solid polymer electrolyte membrane.

The membrane electrode assembly is sandwiched between separators (bipolar plates) to thereby form a power generation cell (unit cell). In use, a predetermined number of power generation cells are stacked together to thereby form an in-vehicle fuel cell stack, for example.

In the fuel cell stack, a fuel gas flow field is formed between the MEA and one of the separators, as one of reactant gas flow fields, and an oxygen-containing gas flow field is formed between the MEA and the other of the separators, as the other of the reactant gas flow fields. Further, a plurality of reactant gas passages extend through the fuel cell stack in the stacking direction. The plurality of reactant gas passages include a fuel gas supply passage for supplying a fuel gas to the fuel gas flow field, a fuel gas discharge passage for discharging the fuel gas from the fuel gas flow field, an oxygen-containing gas supply passage for supplying an oxygen-containing gas to the oxygen-containing gas flow field, and an oxygen-containing gas discharge passage for discharging the oxygen-containing gas from the oxygen-containing gas flow field (e.g., see Japanese Laid-Open Patent Publication No. 2007-141543).

SUMMARY OF THE INVENTION

In the power generation cell, water is produced as a result of power generation reaction. Further, water vapor in the reactant gases is condensed to produce condensed water. If the produced water is retained as stagnant water at the bottom of the reactant gas passage, rust may be produced, or liquid junction may occur due to the stagnant water.

The present invention has been made in consideration of the above problem, and an object of the present invention is to provide a power generation cell having a simple structure in which it is possible to suppress stagnation of produced water at the bottom of a reactant gas passage.

In order to achieve the above object, the present invention provides a power generation cell. The power generation cell includes a membrane electrode assembly, and metal separators provided on respective both sides of the membrane electrode assembly. The membrane electrode assembly and the metal separators are stacked together in a horizontal direction. Each of the metal separators include a reactant gas flow field configured to allow a reactant gas to flow along an electrode surface of the membrane electrode assembly, a reactant gas passage connected to the reactant gas flow field and passing through the metal separators in a separator thickness direction, and a passage bead for sealing, provided around the reactant gas passage and protruding in the separator thickness direction. A water drainage channel configured to connect an inner space of the passage bead with the reactant gas passage is provided at a lower portion of the passage bead.

Preferably, the metal separator further includes a bridge configured to connect an inner side of the passage bead with an outer side thereof, and the water drainage channel is connected to the bridge through the inner space of the passage bead.

Preferably, the lower portion of the passage bead includes a recessed portion, and the width of the recessed portion in a horizontal direction perpendicular to a direction in which the membrane electrode assembly and the metal separators are stacked together is decreased downward, and the water drainage channel is provided at the lowermost portion of the recessed portion.

Preferably, the water drainage channel includes a hole opened on a side wall of the passage bead, and a water drainage tunnel connected to the hole and protruding upward toward the reactant gas passage.

Preferably, the water drainage tunnel extends in a vertical direction.

Preferably, a lower portion of the reactant gas passage includes a recessed portion, and the width of the recessed portion in a horizontal direction perpendicular to a direction in which the membrane electrode assembly and the metal separators are stacked together is decreased downward, and an upper end of the water drainage tunnel is provided at the lowermost portion of the recessed portion of the reactant gas passage.

In the power generation cell of the present invention, with a simple structure, it becomes possible to suppress stagnation of produced water at the bottom of the reactant gas passage.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Hereinafter, preferred embodiments of a power generation cell according to the present invention will be described with reference to the accompanying drawings.

Figure 1:
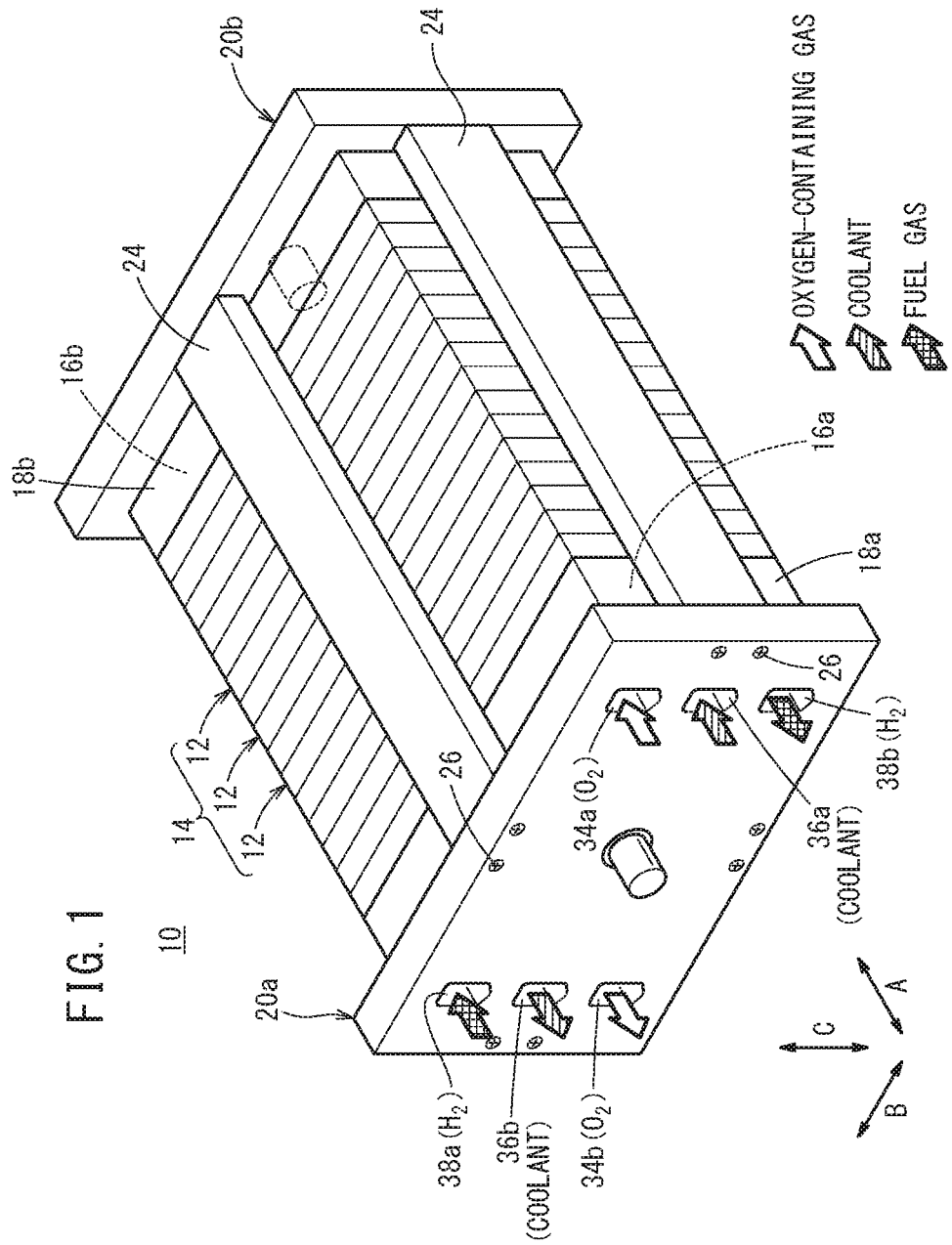
FIG. 1 is a perspective view showing a fuel cell stack.

As shown in FIG. 1, a fuel cell stack 10 includes a stack body 14 formed by stacking a plurality of power generation cells 12 (unit cells) in a horizontal direction indicated by an arrow A. For example, the fuel cell stack 10 is mounted in a fuel cell vehicle such as a fuel cell electric automobile (not shown).

At one end of the stack body 14 in the stacking direction indicated by the arrow A, a terminal plate 16a is provided. An insulator 18a is provided outside the terminal plate 16a, and an end plate 20a is provided outside the insulator 18a. At the other end of the stack body 14 in the stacking direction, a terminal plate 16b is provided. An insulator 18b is provided outside the terminal plate 16b, and an end plate 20b is provided outside the insulator 18b. Coupling bars 24 are provided respectively between sides of the end plates 20a, 20b.

Each of the end plates 20a, 20b has a laterally elongated (or longitudinally elongated) rectangular shape. The coupling bars 24 are provided respectively between sides of the end plates 20a, 20b. Both ends of the coupling bars 24 are fixed to inner surfaces of the end plates 20a, 20b using bolts 26 to apply a tightening load to a plurality of stacked power generation cells 12 in the stacking direction indicated by the arrow A. It should be noted that the fuel cell stack 10 may have a casing including end plates 20a, 20b, and the stack body 14 may be placed in the casing.

Figure 2:
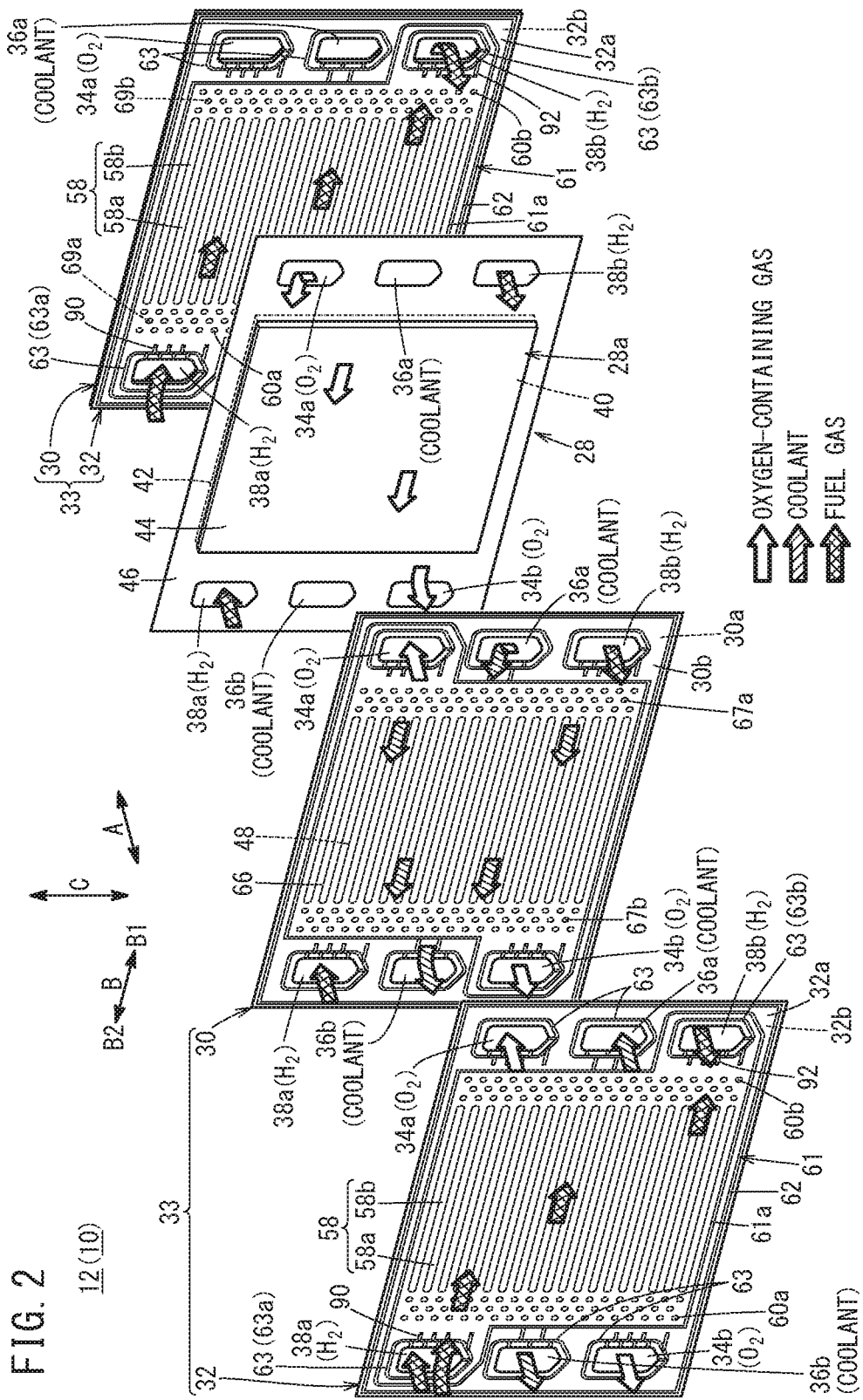
FIG. 2 is an exploded perspective view showing a power generation cell according to an embodiment of the present invention, of a fuel cell stack.

As shown in FIG. 2, the power generation cell 12 includes a resin film equipped membrane electrode assembly (resin film equipped MEA) 28, a first metal separator 30 provided on one surface of the resin film equipped MEA 28, and a second metal separator 32 provided on the other surface of the resin film equipped MEA 28.

Each of the first metal separator 30 and the second metal separator 32 is formed by press forming a metal thin plate so as to have a corrugated shape in cross section. For example, the metal plate is a steel plate, a stainless steel plate, an aluminum plate, a plated steel plate, or a metal plate having an anti-corrosive surface by surface treatment. In a state where the first metal separator 30 of one of the adjacent power generation cells 12 and the second metal separator 32 of the other of the adjacent power generation cells 12 face each other, the outer edges of the first metal separator 30 and the second metal separator 32 are joined together by welding, brazing, crimping, etc., to thereby form a joint separator 33.

At one end of the power generation cell 12 in the longitudinal direction indicated by an arrow B (i.e., one end in a horizontal direction indicated by an arrow B1), an oxygen-containing gas supply passage 34a, a coolant supply passage 36a, and a fuel gas discharge passage 38b are provided. The oxygen-containing gas supply passage 34a, the coolant supply passage 36a, and the fuel gas discharge passage 38b extend through the power generation cell 12 in the stacking direction (indicated by the arrow A). The oxygen-containing gas supply passage 34a, the coolant supply passage 36a, and the fuel gas discharge passage 38b are arranged in the vertical direction (indicated by an arrow C). An oxygen-containing gas is supplied through the oxygen-containing gas supply passage 34a. A coolant such as water is supplied through the coolant supply passage 36a. A fuel gas such as a hydrogen-containing gas is discharged through the fuel gas discharge passage 38b.

At the other end of the power generation cell 12 in the longitudinal direction (i.e., the other end in the direction indicated by an arrow B2), a fuel gas supply passage 38a, a coolant discharge passage 36b, and an oxygen-containing gas discharge passage 34b are provided. The fuel gas supply passage 38a, the coolant discharge passage 36b, and the oxygen-containing gas discharge passage 34b extend through the power generation cell 12 in the stacking direction. The fuel gas supply passage 38a, the coolant discharge passage 36b, and the oxygen-containing gas discharge passage 34b are arranged in the vertical direction. The fuel gas is supplied through the fuel gas supply passage 38a. The coolant is discharged through the coolant discharge passage 36b. The oxygen-containing gas is discharged through the oxygen-containing gas discharge passage 34b. The layout of the oxygen-containing gas supply passage 34a, the oxygen-containing gas discharge passage 34b, the fuel gas supply passage 38a, and the fuel gas discharge passage 38b are not limited to the embodiment of the present invention, and should be determined appropriately according to a required specification.

Figure 3:
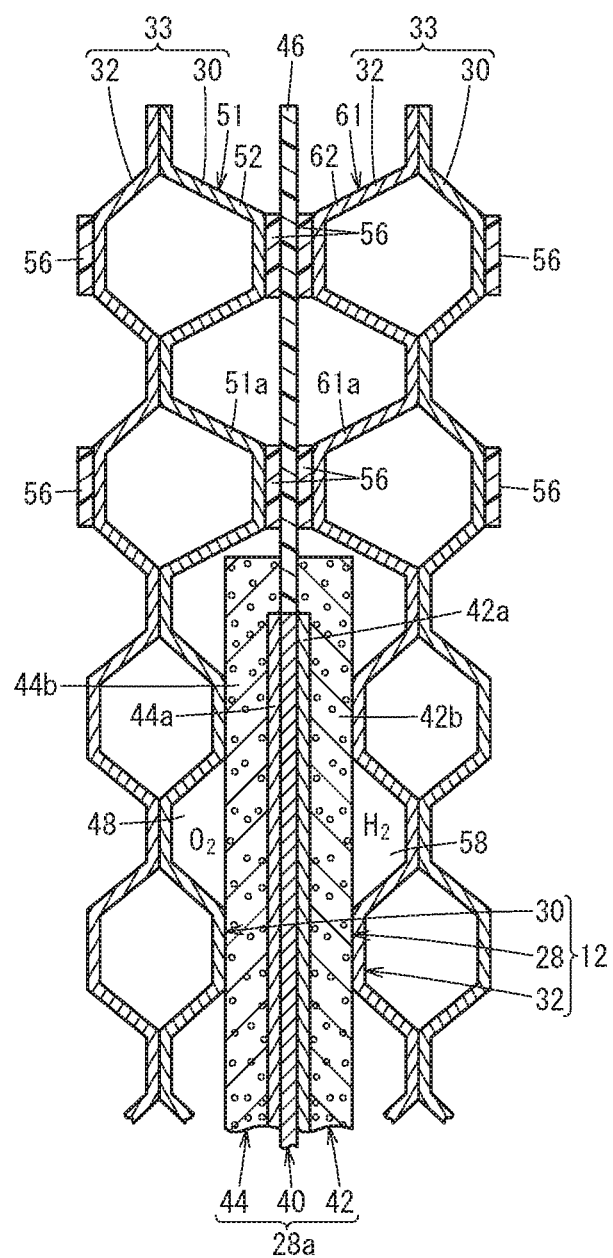
FIG. 3 is a cross sectional view schematically showing the power generation cell.

As shown in FIG. 3, the resin film equipped MEA 28 includes a membrane electrode assembly 28a, and a frame shaped resin film 46 provided on the outer peripheral portion of the membrane electrode assembly 28a. The membrane electrode assembly 28a includes an electrolyte membrane 40, and an anode 42 and a cathode 44 sandwiching the electrolyte membrane 40.

For example, the electrolyte membrane 40 includes a solid polymer electrolyte membrane (cation ion exchange membrane). For example, the solid polymer electrolyte membrane is a thin membrane of perfluorosulfonic acid containing water. The electrolyte membrane 40 is sandwiched between the anode 42 and the cathode 44. A fluorine based electrolyte may be used as the electrolyte membrane 40. Alternatively, an HC (hydrocarbon) based electrolyte may be used as the electrolyte membrane 40.

The cathode 44 includes a first electrode catalyst layer 44a joined to one surface of the electrolyte membrane 40, and a first gas diffusion layer 44b stacked on the first electrode catalyst layer 44a. The anode 42 includes a second electrode catalyst layer 42a joined to the other surface of the electrolyte membrane 40 and a second gas diffusion layer 42b stacked on the second electrode catalyst layer 42a.

The inner end surface of the resin film 46 is positioned so as to be close to, overlapped with, or in contact with (in abutment against) the outer end surface of the electrolyte membrane 40. As shown in FIG. 2, at an end of the resin film 46 in the direction indicated by the arrow B1, the oxygen-containing gas supply passage 34a, the coolant supply passage 36a, and the fuel gas discharge passage 38b are provided. At another end of the resin film 46 in the direction indicated by the arrow B2, the fuel gas supply passage 38a, the coolant discharge passage 36b, and the oxygen-containing gas discharge passage 34b are provided.

For example, the resin film 46 is made of PPS (Poly Phenylene Sulfide), PPA (polyphthalamide), PEN (polyethylene naphtalate), PES (polyethersulfone), LCP (liquid crystal polymer), PVDF (polyvinylidene fluoride), a silicone resin, a fluoro resin, m-PPE (modified Poly Phenylene Ether), PET (polyethylene terephthalate), PBT (polybutylene terephthalate), or modified polyolefin. It should be noted that the electrolyte membrane 40 may be designed to protrude outward without using the resin film 46. Alternatively, a frame shaped film may be provided on both sides of the electrolyte membrane 40 which protrudes outward.

Figure 4:
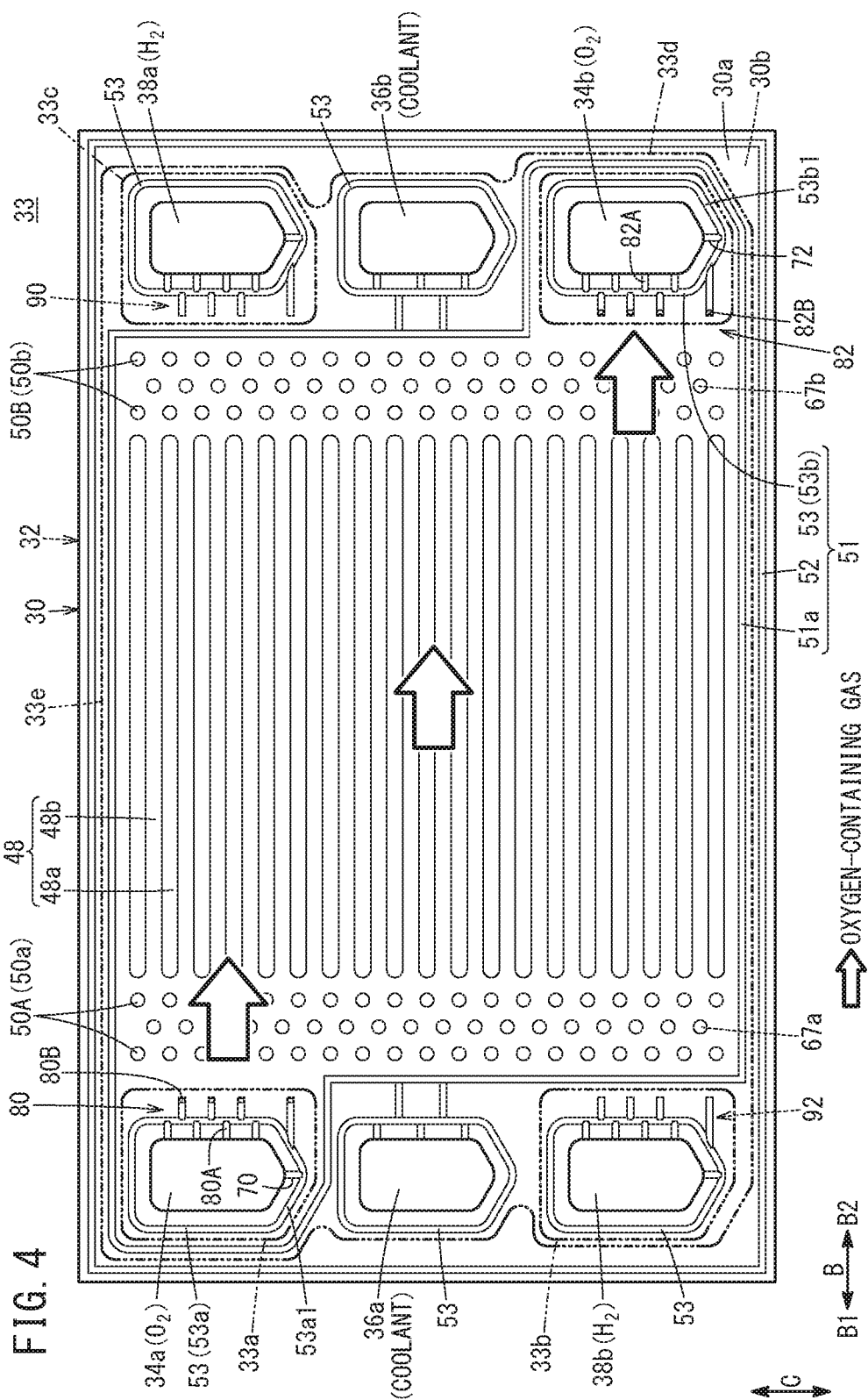
FIG. 4 is a front view showing a first metal separator.

As shown in FIG. 2, an oxygen-containing gas flow field 48 is provided on a surface 30a of the first metal separator 30 facing the resin film equipped MEA 28 (hereinafter referred to as the "surface 30a"). For example, the oxygen-containing gas flow field 48 extends in the direction indicated by the arrow B. As shown in FIG. 4, the oxygen-containing gas flow field 48 is connected to (in fluid communication with) the oxygen-containing gas supply passage 34a and the oxygen-containing gas discharge passage 34b. The oxygen-containing gas flow field 48 includes straight flow grooves 48b between a plurality of ridges 48a extending in the direction indicated by the arrow B. Instead of the plurality of straight flow grooves 48b, a plurality of wavy flow grooves may be provided.

An inlet buffer 50A is provided on a surface 30a of the first metal separator 30, between the oxygen-containing gas supply passage 34a and the oxygen-containing gas flow field 48. The inlet buffer 50A includes a plurality of boss arrays each including a plurality of bosses 50a arranged in the direction indicated by the arrow C. Further, an outlet buffer 50B is provided on the surface 30a of the first metal separator 30, between the oxygen-containing gas discharge passage 34b and the oxygen-containing gas flow field 48. The outlet buffer 50B includes a plurality of boss arrays each including a plurality of bosses 50b arranged in the direction indicated by the arrow C.

On another surface 30b of the first metal separator 30, which is the back side of the oxygen-containing gas flow field 48, boss arrays each including a plurality of bosses 67a arranged in the direction indicated by the arrow C are provided between the boss arrays of the inlet buffer 50A, and boss arrays each including a plurality of bosses 67b arranged in the direction indicated by the arrow C are provided between the boss arrays of the outlet buffer 50B. The bosses 67a, 67b form buffers on the coolant surface.

A first seal line 51 is formed on the surface 30a of the first metal separator 30 by press forming. The first seal line 51 protrudes toward the resin film equipped MEA 28 (FIG. 2). As shown in FIG. 3, resin material 56 is fixed to protruding front surfaces of the first seal line 51 by printing, coating, etc. For example, polyester fiber is used as the resin material 56. The resin material 56 may be provided on the resin film 46. The resin material 56 is not essential, and thus may be omitted.

As shown in FIG. 4, the first seal line 51 includes a bead seal 51a (hereinafter referred to as the "inner bead 51a") provided around the oxygen-containing gas flow field 48, the inlet buffer 50A and the outlet buffer 50B, a bead seal 52 (hereinafter referred to as the "outer bead 52") provided outside the inner bead 51a along the outer periphery of the first metal separator 30, and a plurality of bead seals 53 (hereinafter referred to as the "passage beads 53") provided respectively around the plurality of fluid passages (oxygen-containing gas supply passage 34a, etc.). The outer bead 52 protrudes from the surface 30a of the first metal separator 30 toward the resin film equipped MEA 28, and circumferentially extends along the outer peripheral edge of the surface 30a thereof.

The plurality of passage beads 53 protrude from the surface 30a of the first metal separator 30 toward the resin film equipped MEA 28. The passage beads 53 are provided respectively around the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b.

Hereinafter, of the plurality of passage beads 53, a passage bead formed around the oxygen-containing gas supply passage 34a will be referred to as the "passage bead 53a", and a passage bead formed around the oxygen-containing gas discharge passage 34b will be referred to as the "passage bead 53b". The first metal separator 30 has bridges 80, 82 connecting the inside (the side of the fluid passages 34a, 34b) and the outside (the side of the oxygen-containing gas flow field 48) of the passage beads 53a, 53b.

As described above, the passage bead 53a surrounds the oxygen-containing gas supply passage 34a, and the bridge 80 is provided on a side portion of the passage bead 53a that is positioned closer to the oxygen-containing gas flow field 48. A water drainage channel 70 is provided at a lower portion 53a1 (bottom portion) of the passage bead 53a. The water drainage channel 70 connects an inner space 53d (FIG. 6) of the passage bead 53a with the oxygen-containing gas supply passage 34a.

As described above, the passage bead 53b surrounds the oxygen-containing gas discharge passage 34b, and the bridge 82 is provided on a side portion of the passage bead 53b that is positioned closer to the oxygen-containing gas flow field 48. A water drainage channel 72 is provided at a lower portion 53b1 of the passage bead 53b in the direction of gravity. The water drainage channel 72 connects an inner space of the passage bead 53b with the oxygen-containing gas discharge passage 34b.

The first metal separator 30 and the second metal separator 32 of the joint separator 33 are joined together by welding along laser welding lines 33a to 33e. The laser welding line 33a is formed around the oxygen-containing gas supply passage 34a and the bridge 80. The laser welding line 33b is formed around the fuel gas discharge passage 38b and a bridge 92 described later. The laser welding line 33c is formed around the fuel gas supply passage 38a and a bridge 90 described later. The laser welding line 33d is formed around the oxygen-containing gas discharge passage 34b and the bridge 82. The laser welding line 33e is formed along the outer periphery of the joint separator 33 so as to surround the oxygen-containing gas flow field 48, the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b.

The passage bead 53a and the passage bead 53b have the same structure. Further, the bridge 80 adjacent to the oxygen-containing gas supply passage 34a and the bridge 82 adjacent to the oxygen-containing gas discharge passage 34b have the same structure. Further, the water drainage channel 70 and the water drainage channel 72 have the same structure. Therefore, hereinafter, as a representative example, the configurations of the passage bead 53a, the bridge 80, and the water drainage channel 70 will be described in detail, and the detailed description about the configurations of the passage bead 53b, the bridge 82, and the water drainage channel 72 will be omitted.

Figure 5:
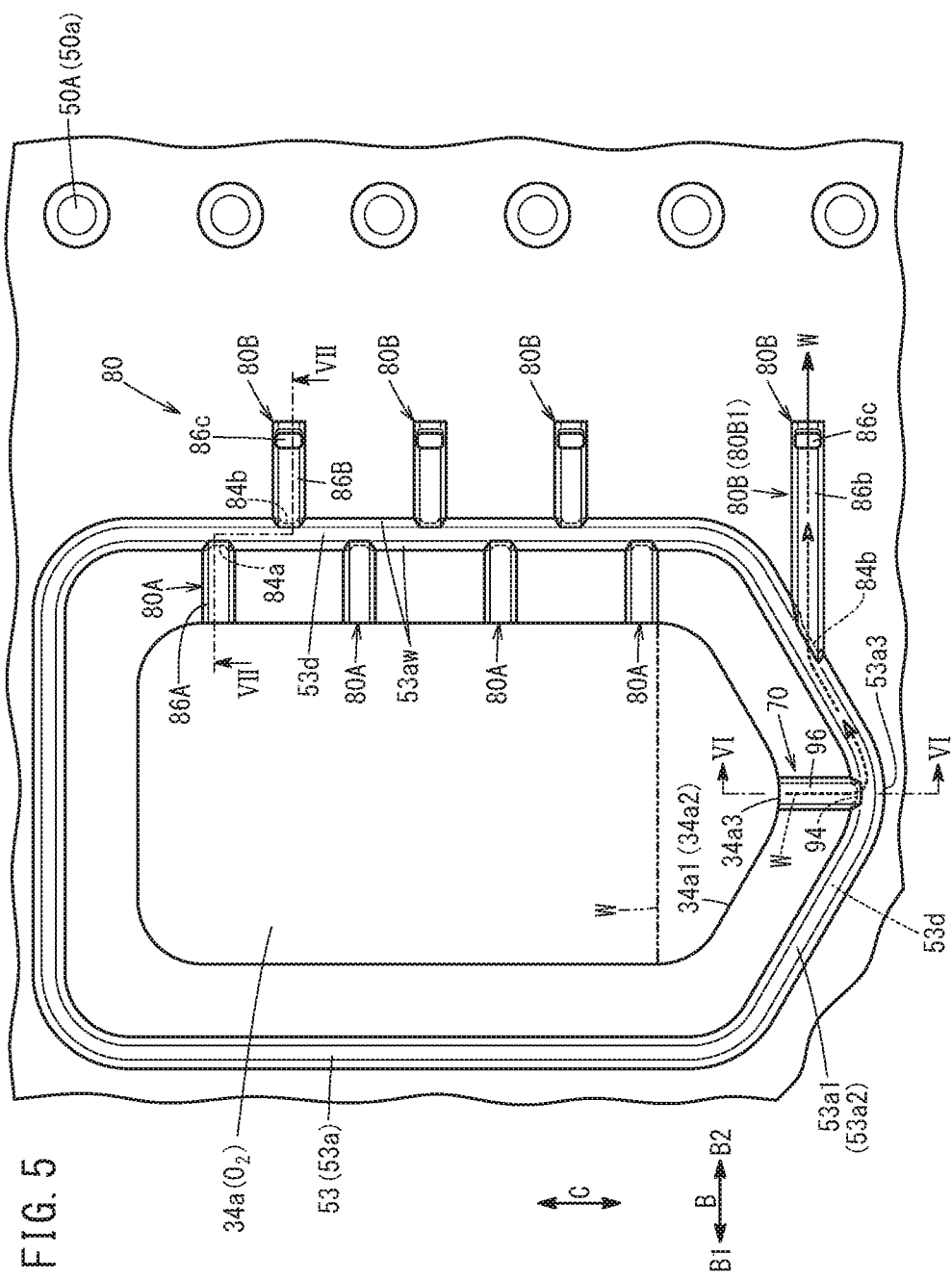
FIG. 5 is a partial enlarged view showing an area around an oxygen-containing gas supply passage of the first metal separator.

As shown in FIG. 5, the bridge 80 includes a plurality of inner bridges 80A arranged on the inner side of the passage bead 53a at intervals, and a plurality of outer bridges 80B arranged on the outer side of the passage bead 53a at intervals.

Each of the inner bridges 80A includes a through hole 84a provided on one side of the ridge of the passage bead 53a (side wall 53aw on the inner side of the passage bead 53a), and an inner tunnel 86A connected to the through hole 84a. The inner tunnel 86A is formed by press forming. The inner tunnel 86A protrudes from the side wall 53aw of the passage bead 53a toward the oxygen-containing gas supply passage 34a. An end of the inner tunnel 86A opposite to the side connected to the passage bead 53a is opened to the oxygen-containing gas supply passage 34a.

Each of the outer bridges 80B includes a through hole 84b provided on the other side of the ridge of the passage bead 53a (side wall 53aw on the outer side of the passage bead 53a), and an outer tunnel 86B connected to the through hole 84b. The outer tunnel 86B is formed by press forming. The outer tunnel 86B protrudes from the side wall 53aw of the passage bead 53a toward the oxygen-containing gas flow field 48.

In the embodiment of the present invention, the plurality of inner bridges 80A and the plurality of outer bridges 80B are arranged in a staggered manner (in a zigzag pattern) along the passage bead 53a. It should be noted that the plurality of inner bridges 80A and the plurality of outer bridges 80B may be arranged face-to-face with each other across the passage bead 53a.

Figure 7:
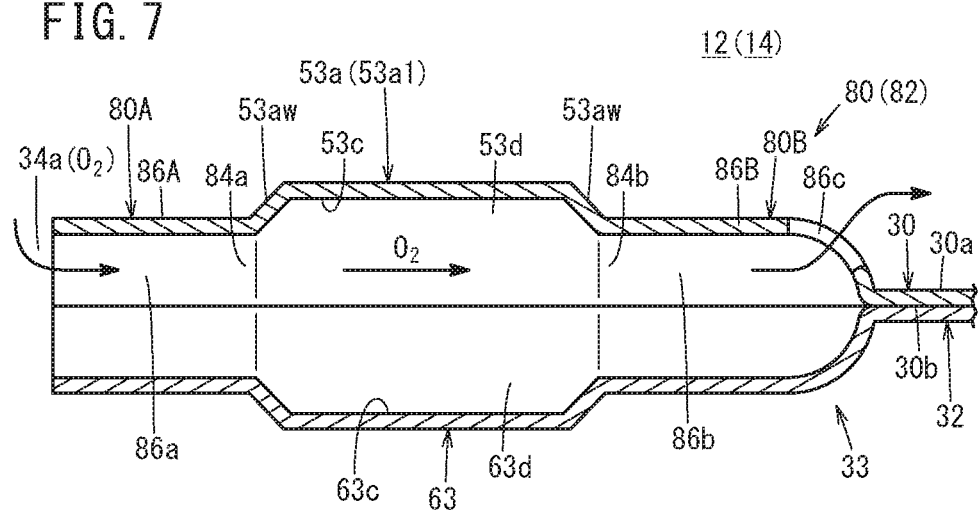
FIG. 7 is a cross sectional view taken along a line VII-VII in FIG. 5.

As shown in FIG. 7, the first metal separator 30 has a recess 53c on the back of the passage bead 53a having a ridge shape. The recess 53c forms an inner space 53d of the passage bead 53a. The through holes 84a, 84b connect the inner space 53d of the passage bead 53a with the outside. The recess 53c of the first metal separator 30 and the recess 63c of the second metal separator 32 on the back of the passage bead 63 face each other. Therefore, the inner space 53d of the passage bead 53a of the first metal separator 30 is connected to an inner space 63d of the passage bead 63 of the second metal separator 32.

Each of the inner tunnel 86A and the outer tunnel 86B has a ridge shape protruding from the surface 30a of the first metal separator 30 toward the MEA 28. The inner tunnel 86A and the outer tunnel 86B contain therein respective tunnel channels 86a, 86b communicating with the inner space 53d of the passage bead 53a respectively through the through holes 84a, 84b. The inner tunnel 86A connects the oxygen-containing gas supply passage 34a with the inner space 53d. The outer tunnel 86B connects the inner space 53d with the oxygen-containing gas flow field 48 (FIG. 4). The outer tunnel 86B has an opening 86c at an end opposite to a portion connected to the passage bead 53a. The opening 86c allows the inside and the outside of the outer tunnel 86B to communicate with each other.

As shown in FIG. 5, a bottom 34a1 of the oxygen-containing gas supply passage 34a includes a recessed portion 34a2 having a width in a horizontal direction (i.e., in a direction indicated by an arrow B) perpendicular to the stacking direction (which will hereinafter be referred to as a horizontal direction), and the horizontal width of the recessed portion 34a2 is decreased downward. In the embodiment of the present invention, the recessed portion 34a2 has a V-shape. Alternatively, the recessed portion 34a2 may have a circular arc shape. As in the case of the bottom 34a1 of the oxygen-containing gas supply passage 34a, each of the bottoms of the other fluid passages 34b, 36a, 36b, 38a, 38b includes a recessed portion having a horizontal width (in the direction indicated by the arrow B) which is decreased downward.

A lower portion 53a1 (bottom portion) of the passage bead 53a in the gravity direction includes a recessed portion 53a2 having a horizontal width in a direction perpendicular to the stacking direction, and the horizontal width of the recessed portion 53a2 is decreased downward. In the embodiment of the present invention, the recessed portion 53a2 has a V-shape. Alternatively, the recessed portion 53a2 may have a circular arc shape.

The water drainage channel 70 is provided at the recessed portion 53a2 of the passage bead 53a. In the embodiment of the present invention, the water drainage channel 70 includes a hole 94 formed in the side wall 53aw on the inner side of the passage bead 53a, and a water drainage tunnel 96 connected to the hole 94. The water drainage tunnel 96 is formed by press forming. The water drainage tunnel 96 protrudes in the same direction as the direction (stacking direction) in which the passage bead 53a protrudes.

Figure 6:
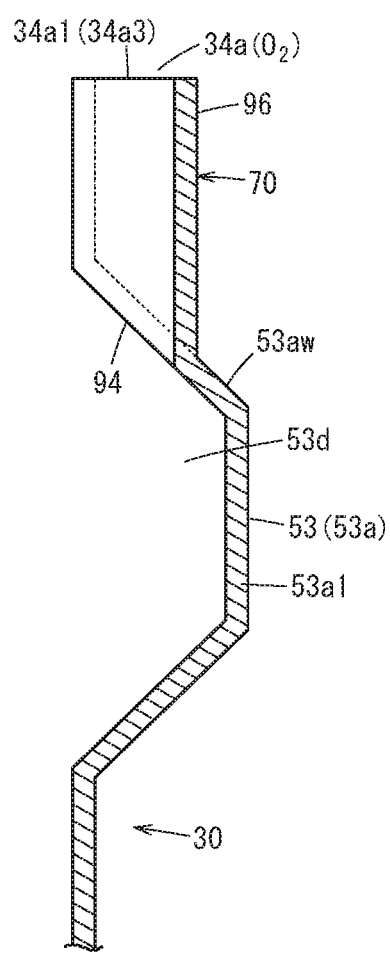
FIG. 6 is a cross sectional view showing the first metal separator taken along a line VI-VI in FIG. 5.

As shown in FIGS. 5 and 6, the water drainage tunnel 96 protrudes upward from the lower portion 53a1 of the passage bead 53a, and connects the oxygen-containing gas supply passage 34a with the inner space 53d of the passage bead 53a. An upper end of the water drainage tunnel 96 is opened to the oxygen-containing gas supply passage 34a. The upper end of the water drainage tunnel 96 is positioned at the lowermost portion 34a3 of the bottom 34a1 of the oxygen-containing gas supply passage 34a. A lower end of the water drainage tunnel 96 is connected to the lowermost portion 53a3 of the passage bead 53a. Therefore, the water drainage tunnel 96 extends in the vertical direction. It should be noted that the water drainage tunnel 96 may extend obliquely with respect to the vertical direction.

As shown in FIG. 5, the water drainage channel 70 is connected to the bridge 80 through the inner space 53d of the passage bead 53a. Therefore, the hole 94 of the water drainage channel 70 is connected to the oxygen-containing gas flow field 48 through the inner space 53d of the passage bead 53a and the outer bridges 80B. Among the plurality of outer bridges 80B, an outer bridge 80B1 that is located at the lowermost position is located at a position that is the closest to the water drainage channel 70. The outer bridge 80B1 at the lowermost position is positioned below the lowermost portion of the oxygen-containing gas supply passage 34a, and above the lowermost portion 53a3 of the passage bead 53a.

The outer bridge 80B1 at the lowermost position may be positioned at the same height as the lowermost portion 53a3 of the passage bead 53a or below the lowermost portion 53a3 thereof. The outer bridge 80B1 may be inclined downward with respect to the horizontal direction toward the oxygen-containing gas flow field 48.

Figure 8:
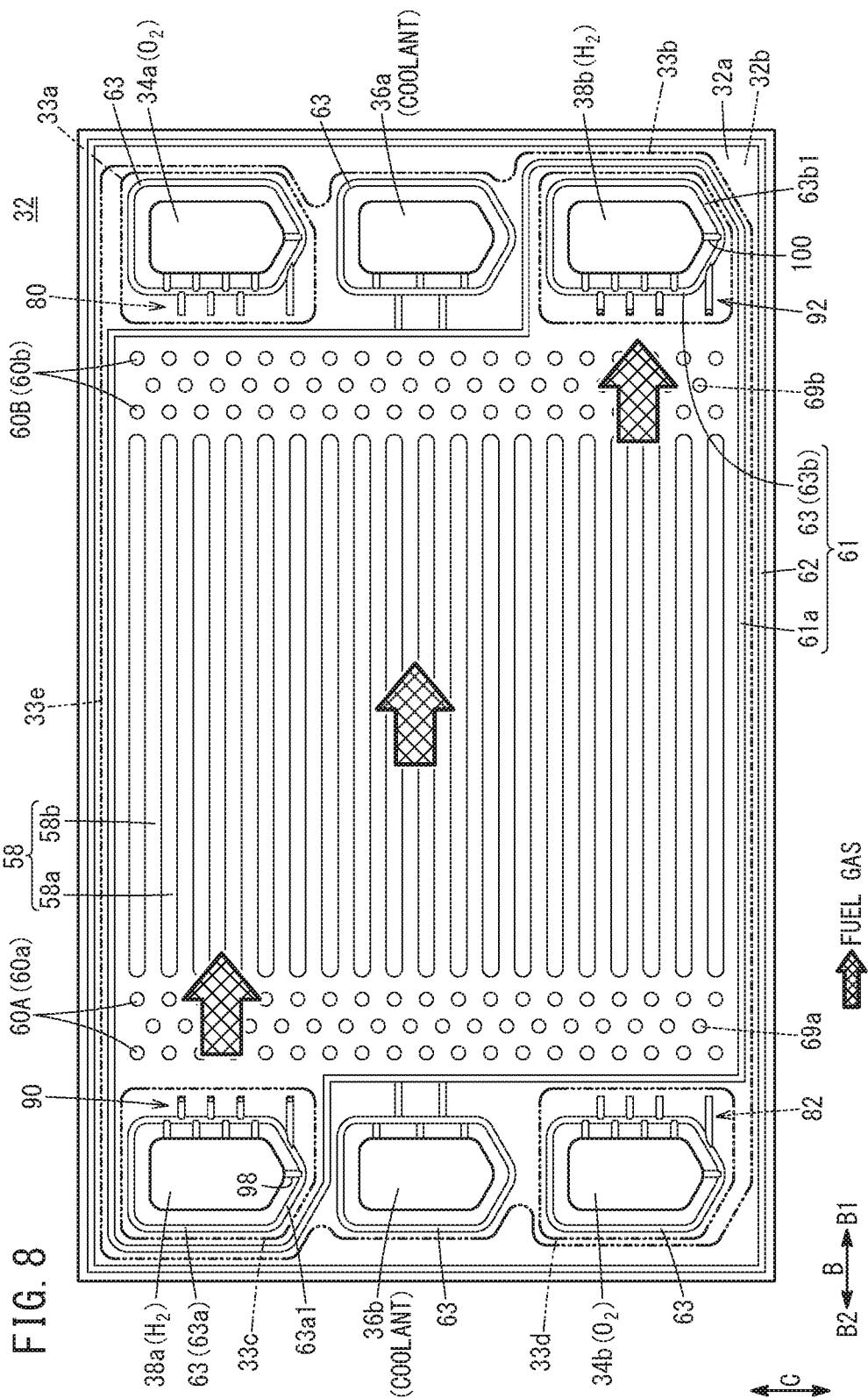
FIG. 8 is a front view showing a second metal separator.

As shown in FIG. 2, the second metal separator 32 has a fuel gas flow field 58 on its surface 32a facing the resin film equipped MEA 28 (hereinafter referred to as the "surface 32a"). For example, the fuel gas flow field 58 extends in the direction indicated by the arrow B. As shown in FIG. 8, the fuel gas flow field 58 is connected to (in fluid communication with) the fuel gas supply passage 38a and the fuel gas discharge passage 38b. The fuel gas flow field 58 includes straight flow grooves 58b between a plurality of ridges 58a extending in the direction indicated by the arrow B. A plurality of wavy flow groves may be provided instead of the plurality of straight flow grooves 58b.

An inlet buffer 60A is provided on the surface 32a of the second metal separator 32, between the fuel gas supply passage 38a and the fuel gas flow field 58. The inlet buffer 60A includes a plurality of boss arrays each including a plurality of bosses 60a arranged in the direction indicated by the arrow C. Further, an outlet buffer 60B is provided on the surface 32a of the second metal separator 32, between the fuel gas discharge passage 38b and the fuel gas flow field 58. The outlet buffer 60B includes a plurality of boss arrays each including a plurality of bosses 60b.

On another surface 32b of the second metal separator 32, which is the back side of the fuel gas flow field 58, boss arrays each including a plurality of bosses 69a arranged in the direction indicated by the arrow C are provided between the boss arrays of the inlet buffer 60A, and other boss arrays each including a plurality of bosses 69b arranged in the direction indicated by the arrow C are provided between the boss arrays of the outlet buffer 60B. The bosses 69a, 69b form buffers on the coolant surface.

A second seal line 61 is formed on the surface 32a of the second metal separator 32 by press forming. The second seal line 61 protrudes toward the resin film equipped MEA 28. As shown in FIG. 3, resin material 56 is fixed to protruding front surfaces of the second seal line 61 by printing, coating, etc. For example, polyester fiber is used as the resin material 56. The resin material 56 may be provided on the resin film 46. The resin material 56 is not essential, and thus may be omitted.

As shown in FIG. 8, the second seal line 61 includes a bead seal 61a (hereinafter referred to as the "inner bead 61a") provided around the fuel gas flow field 58, the inlet buffer 60A and the outlet buffer 60B, a bead seal 62 (hereinafter referred to as the "outer bead 62") provided outside the inner bead 61a along the outer periphery of the second metal separator 32, and a plurality of bead seals 63 (hereinafter referred to as the "passage beads 63") provided respectively around the plurality of fluid passages (fluid passage 38a, etc.). The outer bead 62 protrudes from the surface 32a of the second metal separator 32, and circumferentially extends along the outer peripheral edge of the surface 32a thereof.

The plurality of passage beads 63 protrude from the surface 32a of the second metal separator 32. The passage beads 63 are provided respectively around the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b.

The second metal separator 32 has bridges 90, 92 connecting the inside (the side of the fluid passages 38a, 38b) and the outside (the side of the fuel gas flow field 58) of the passage beads 63a, 63b surrounding respectively the fuel gas supply passage 38a and the fuel gas discharge passage 38b.

As described above, the passage bead 63a surrounds the fuel gas supply passage 38a, and the bridge 90 is provided on a side portion of the passage bead 63a that is positioned closer to the fuel gas flow field 58. A water drainage channel 98 is provided at a lower portion 63a1 (bottom portion) of the passage bead 63a in the direction of gravity. The water drainage channel 98 connects the inner space 63d of the passage bead 63a with the fuel gas supply passage 38a.

As described above, the passage bead 63b surrounds the fuel gas discharge passage 38b, and the bridge 92 is provided on a side portion of the passage bead 63b that is positioned closer to the fuel gas flow field 58. The bridge 92 includes outer bridges and inner bridges arranged at intervals. A water drainage channel 100 is provided at a lower portion 63b1 (bottom portion) of the passage bead 63b in the direction of gravity. The water drainage channel 100 connects an inner space of the passage bead 63b with the fuel gas discharge passage 38b.

These bridges 90, 92 of the second metal separator 32 have the same structure as the above bridges 80, 82 (FIG. 4) of the first metal separator 30. The passage beads 63a, 63b have the same structure and the same layout as the above described passage beads 53a, 53b (FIG. 4). The water drainage channels 98, 100 have the same structure and the same layout as the above described water drainage channels 70, 72 (FIG. 4).

As shown in FIG. 2, a coolant flow field 66 is formed between the surface 30b of the first metal separator 30 and the surface 32b of the second metal separator 32 that are joined together. The coolant flow field 66 is connected to (in fluid communication with) the coolant supply passage 36a and the coolant discharge passage 36b. The coolant flow field 66 is formed by stacking a back surface of the first metal separator 30 provided with the oxygen-containing gas flow field 48 and a back surface of the second metal separator 32 provided with the fuel gas flow field 58. The first metal separator 30 and the second metal separator 32 are joined together by welding outer peripheries thereof and areas around the fluid passages. The first metal separator 30 and the second metal separator 32 may be joined together by brazing, instead of welding.

Operation of the fuel cell stack 10 having the above structure will be described below.

Firstly, as shown in FIG. 1, an oxygen-containing gas such as the air is supplied to the oxygen-containing gas supply passage 34a of the end plate 20a. A fuel gas such as a hydrogen-containing gas is supplied to the fuel gas supply passage 38a of the end plate 20a. Coolant such as pure water, ethylene glycol, oil is supplied to the coolant supply passage 36a of the end plate 20a.

As shown in FIG. 2, the oxygen-containing gas flows from the oxygen-containing gas supply passage 34a into the oxygen-containing gas flow field 48 of the first metal separator 30 through the bridge 80 (see FIG. 4). At this time, as shown in FIG. 7, the oxygen-containing gas first flows from the oxygen-containing gas supply passage 34a toward the surface 30b of the first metal separator 30 (between the first metal separator 30 and the second metal separator 32), and then the oxygen-containing gas flows into the inner tunnel 86A (tunnel channel 86a), into the passage bead 53a (inner space 53d), and into the outer tunnel 86B (tunnel channel 86b). Thereafter, the oxygen-containing gas flows out of the opening 86c toward the surface 30a of the first metal separator 30. As shown in FIG. 2, the oxygen-containing gas flows along the oxygen-containing gas flow field 48 in the direction indicated by the arrow B, and the oxygen-containing gas is supplied to the cathode 44 of the membrane electrode assembly 28a.

In the meanwhile, the fuel gas flows from the fuel gas supply passage 38a into the fuel gas flow field 58 of the second metal separator 32 through the bridge 90 (FIG. 8). The fuel gas flows along the fuel gas flow field 58 in the direction indicated by the arrow B, and the fuel gas is supplied to the anode 42 of the membrane electrode assembly 28a.

Thus, in each of the membrane electrode assemblies 28a, the oxygen-containing gas supplied to the cathode 44 and the fuel gas supplied to the anode 42 are consumed in the electrochemical reactions in the first electrode catalyst layer 44a and the second electrode catalyst layer 42a to thereby generate electricity.

Then, after the oxygen-containing gas supplied to the cathode 44 has been consumed at the cathode 44, the oxygen-containing gas from the oxygen-containing gas flow field 48 flows through the bridge 82 toward the oxygen-containing gas discharge passage 34b, and then the oxygen-containing gas is discharged along the oxygen-containing gas discharge passage 34b in the direction indicated by the arrow A. Likewise, after the fuel gas supplied to the anode 42 has been consumed at the anode 42, the fuel gas from the fuel gas flow field 58 flows through the bridge 92 (FIG. 8) toward the fuel gas discharge passage 38b, and then the fuel gas is discharged along the fuel gas discharge passage 38b in the direction indicated by the arrow A.

Further, the coolant supplied to the coolant supply passage 36a flows into the coolant flow field 66 formed between the first metal separator 30 and the second metal separator 32, and then the coolant flows in the direction indicated by the arrow B. After the coolant has cooled the membrane electrode assembly 28a, the coolant is discharged from the coolant discharge passage 36b.

In this case, the power generation cell 12 of the embodiment of the present invention offers the following advantageous effects.

In the power generation cell 12, the water drainage channels 70, 72, 98, 100 are provided at the lower portions (bottom portions) of the passage beads 53a, 53b, 63a, 63b formed around the reactant gas passages (the oxygen-containing gas supply passage 34a, the oxygen-containing gas discharge passage 34b, the fuel gas supply passage 38a, and the fuel gas discharge passage 38b). The water drainage channels 70, 72, 98, 100 are connected to the inner spaces of the passage beads 53a, 53b, 63a, 63b. In the structure, after the produced water W flows toward the lower portions of the passage beads 53a, 53b, 63a, 63b, the produced water W flows into the inner spaces of the passage beads 53a, 53b, 63a, 63b through the water drainage channels 70, 72, 98, 100, and then the produced water W is discharged from the reactant gas passages.

For example, as a representative example, the water drainage channel 70 shown in FIG. 5 will be described below. The produced water W flows from the oxygen-containing gas supply passage 34a into the inner space 53d of the passage bead 53a through the water drainage channel 70, and flows inside the inner space 53d. Then, the produced water W is discharged toward the oxygen-containing gas flow field 48 through the outer bridge 80B1 at the lowermost position. Therefore, it becomes possible to suppress stagnation of the produced water W at the bottom of the reactant gas passage. Further, it is possible to prevent disturbance of the flow distribution of the reactant gas.

Unlike the present invention, in the case where the water drainage channels 70, 72, 98, 100 are not provided, for example, as indicated by an imaginary line in FIG. 5, stagnation of the produced water W tends to occur in the reactant gas passage. If stagnation of the produced water W occurs, rust or liquid junction may occur. Further, if a large quantity of the produced water W is retained in the reactant gas passage, flow distribution of the reactant gas may be disturbed disadvantageously. In the present invention, it is possible to solve such a problem.

The bridges 80, 82 are formed on the first metal separator 30. The bridges 80, 82 connect the inner side of the passage beads 53a, 53b with the outer side thereof. The water drainage channels 70, 72 are connected to the bridges 80, 82 through the inner spaces of the passage beads 53a, 53b. The bridges 90, 92 are formed on the second metal separator 32. The bridges 90, 92 connect the inner side of the passage beads 63a, 63b with the outer side thereof. The water drainage channels 98, 100 are connected to the bridges 90, 92 through the inner spaces of the passage beads 63a, 63b. In the structure, the produced water W guided into the inner spaces of the passage beads 53a, 53b, 63a, 63b from the reactant gas passages is discharged into the reactant gas flow field through the bridges 80, 82, 90, 92. Therefore, it is possible to discharge the produced water W from the reactant gas passages suitably to a greater extent.

The lower portions 53a1, 53b1, 63a1, 63b1 of the passage beads 53a, 53b, 63a, 63b have recessed shapes (recessed portion 53a2, etc.) having a horizontal width in a direction perpendicular to the stacking direction, and the horizontal width is gradually decreased downward. The water drainage channels 70, 72, 98, 100 are provided at the lowermost portion of the recessed portions. In the structure, since the produced water W is guided effectively toward the water drainage channels 70, 72, 98, 100, it is possible to improve the performance of discharging of the produce water W to a greater extent.

Figure 9:
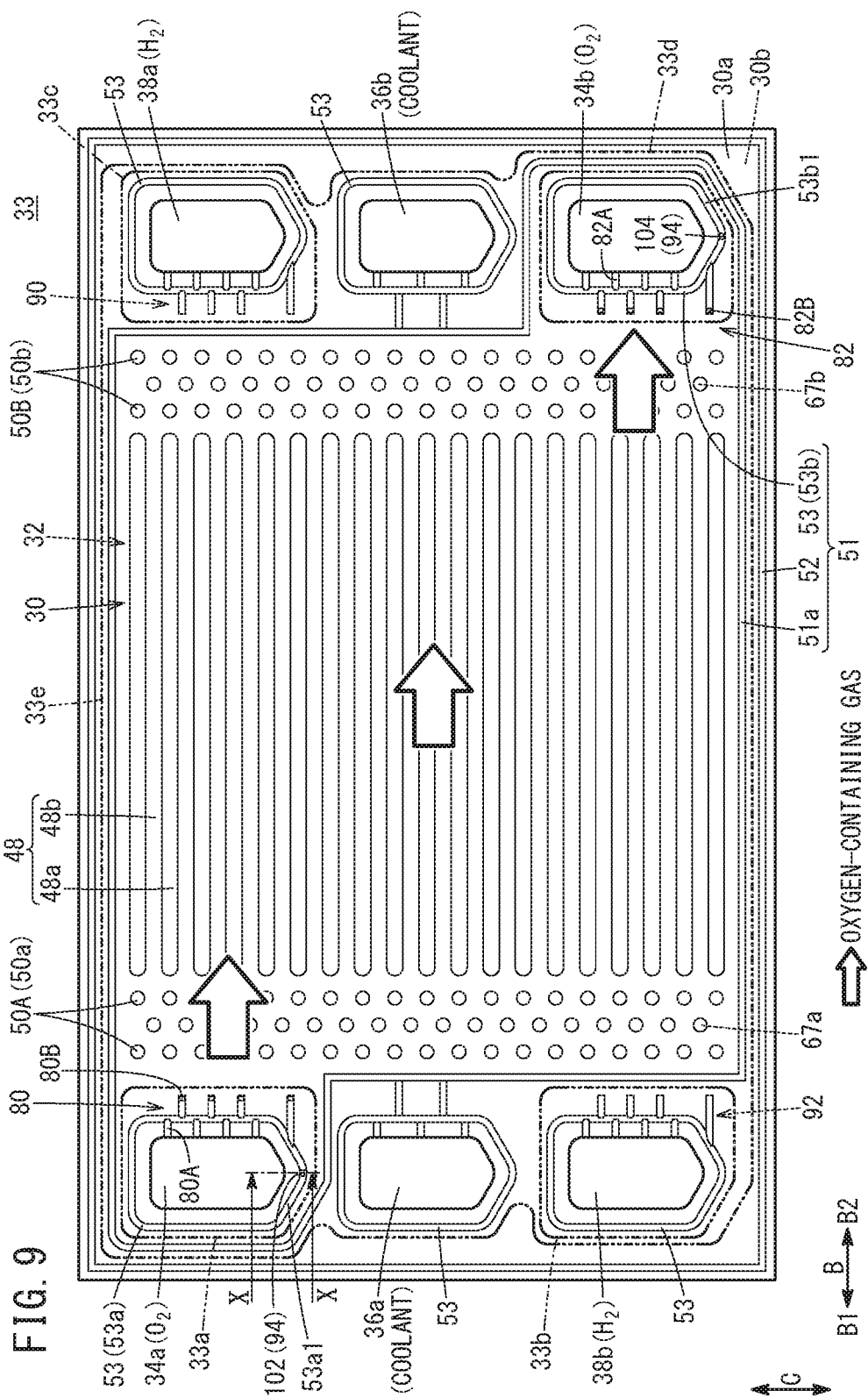
FIG. 9 is a front view showing a first metal separator according to a modified embodiment.
Figure 10:
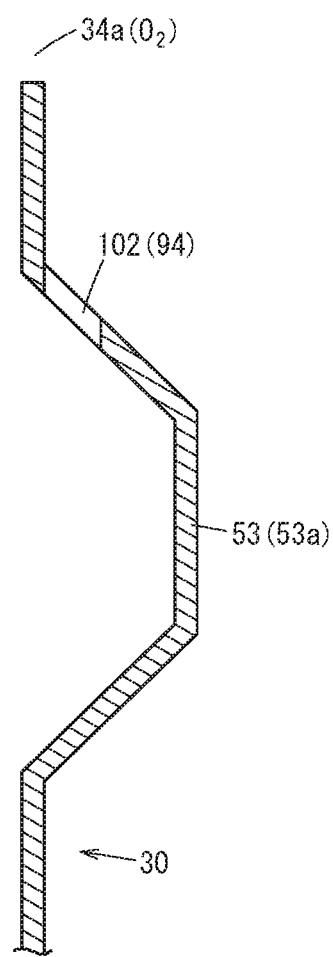
FIG. 10 is a cross sectional view showing the first metal separator taken along a line X-X in FIG. 9.

Although the structure including the water drainage channels 70, 72, 98, 100 having the water drainage tunnel 96 has been described above, the present invention is not limited in this respect. As shown in FIGS. 9 and 10, water drainage channels 102, 104 which do not have any water drainage tunnel may be provided on the first metal separator 30, and as shown in FIG. 11, water drainage channels 106, 108 which do not have any water drainage tunnel may be provided on the second metal separator 32.

As shown in FIGS. 9 and 10, the water drainage channel 102 adjacent to the oxygen-containing gas supply passage 34a is formed by a hole 94 provided at the lower portion 53a1 of the passage bead 53a, and the water drainage channel 104 adjacent to the oxygen-containing gas discharge passage 34b is formed by a hole 94 provided at the lower portion 53b1 of the passage bead 53b.

Figure 11:
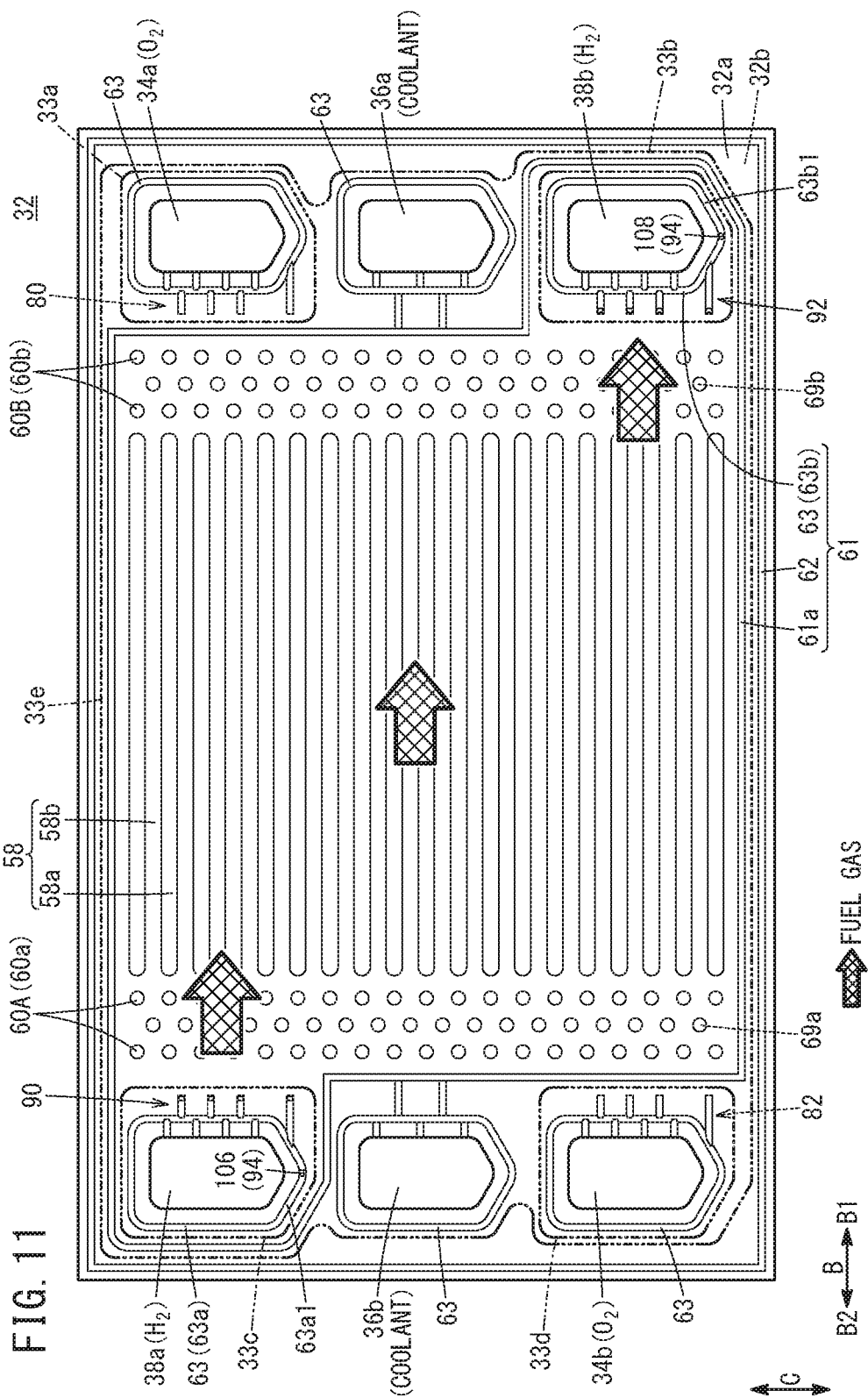
FIG. 11 is a front view showing a second metal separator according to the modified embodiment.

In FIG. 11, the water drainage channel 106 adjacent to the fuel gas supply passage 38a is formed by a hole 94 provided at the lower portion 63a1 of the passage bead 63a, and the water drainage channel 108 of the fuel gas discharge passage 38b is formed by a hole 94 provided at the lower portion 63b1 of the passage bead 63b.

The present invention is not limited to the above described embodiment. Various modifications may be made without departing from the scope of the present invention.

What is claimed is:

1. A power generation cell comprising:
   a plate-shaped membrane electrode assembly; and
   metal separators provided respectively on one surface and another surface of the membrane electrode assembly, the membrane electrode assembly and the metal separators being stacked together in a horizontal direction,
   wherein each of the metal separators comprises:
   a reactant gas flow field configured to allow a reactant gas to flow along an electrode surface of the membrane electrode assembly;
   a reactant gas passage connected to the reactant gas flow field, positioned outward of the reactant gas flow field in the horizontal direction, and passing through the metal separator in a separator thickness direction;
   a passage bead for sealing, provided around the reactant gas passage and protruding in the separator thickness direction;
   a bridge configured to connect an inner side of the passage bead with an outer side thereof,
   wherein a lower portion of the passage bead includes a recessed portion, and a width of the recessed portion in a horizontal direction perpendicular to a direction in which the membrane electrode assembly and the metal separators are stacked together is decreased downward, and
   wherein a water drainage channel configured to connect an inner space of the passage bead with the reactant gas passage is provided separately from the bridge at a lowermost portion of the recessed portion of the passage bead.

2. The power generation cell according to claim 1, wherein
the water drainage channel is connected to the bridge through the inner space of the passage bead.

3. The power generation cell according to claim 1, wherein the water drainage channel includes a hole opened on a side wall of the passage bead, and a water drainage tunnel connected to the hole and protruding upward toward the reactant gas passage.

4. The power generation cell according to claim 3, wherein the water drainage tunnel extends in a vertical direction.

5. The power generation cell according to claim 3, wherein a lower portion of the reactant gas passage includes a recessed portion, and a width of the recessed portion in a horizontal direction perpendicular to a direction in which the membrane electrode assembly and the metal separators are stacked together is decreased downward; and
an upper end of the water drainage tunnel is provided at a lowermost portion of the recessed portion of the reactant gas passage.

6. The power generation cell according to claim 2, wherein the bridge includes a plurality of outer bridges in a form of tunnels, the outer bridges protruding from an outer side of the passage bead; and
of the plurality of outer bridges, an outer bridge provided at a lowermost position is located at a position that is closest to the water drainage channel.

7. The power generation cell according to claim 2, wherein the bridge includes a plurality of outer bridges in a form of tunnels, the outer bridges protruding from an outer side of the passage bead; and
of the plurality of outer bridges, an outer bridge provided at a lowermost position is positioned below a lowermost portion of the reactant gas passage.

8. The power generation cell according to claim 7, wherein, of the plurality of outer bridges, the outer bridge provided at the lowermost position is positioned above a lowermost portion of the passage bead.

9. The power generation cell according to claim 7, wherein the passage bead includes an inclined portion inclined with respect to the horizontal direction; and
of the plurality of outer bridges, the outer bridge provided at the lowermost position is connected to the inclined portion.

10. The power generation cell according to claim 7, wherein, of the plurality of outer bridges, the outer bridge provided at the lowermost position is positioned closer to the reactant gas flow field in comparison with the water drainage channel.

* * * * *